(12) United States Patent
Forte et al.

(10) Patent No.: US 11,059,513 B2
(45) Date of Patent: Jul. 13, 2021

(54) STEERING COLUMN FOR MOTOR VEHICLES

(71) Applicants: THYSSENKRUPP PRESTA AG, Eschen (LI); thyssenkrupp AG, Essen (DE)

(72) Inventors: Sebastian Forte, Mauren (LI); Robert Galehr, Schaanwald (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 108 days.

(21) Appl. No.: 16/604,688

(22) PCT Filed: Apr. 11, 2018

(86) PCT No.: PCT/EP2018/059248
§ 371 (c)(1),
(2) Date: Oct. 11, 2019

(87) PCT Pub. No.: WO2018/189222
PCT Pub. Date: Oct. 18, 2018

(65) Prior Publication Data
US 2021/0129898 A1    May 6, 2021

(30) Foreign Application Priority Data
Apr. 12, 2017 (DE) ............... 10 2017 206 276.2

(51) Int. Cl.
*B62D 5/00* (2006.01)
*B62D 1/16* (2006.01)

(52) U.S. Cl.
CPC ............ *B62D 5/001* (2013.01); *B62D 1/16* (2013.01)

(58) Field of Classification Search
CPC .................................. B62D 1/16; B62D 5/001
See application file for complete search history.

(56) References Cited

U.S. PATENT DOCUMENTS

| 4,932,511 A | 6/1990 | Ames |
| 10,471,990 B2 * | 11/2019 | Zuzelski ............... B62D 5/005 |

(Continued)

FOREIGN PATENT DOCUMENTS

| CN | 202368633 U | 8/2012 |
| CN | 104859706 A | 8/2015 |

(Continued)

OTHER PUBLICATIONS

Hauser, Bernd. Translation of WO 2018/089058 A1 "Steering Mechanism for a Motor Vehicle". Published Jun. 1, 2017. Filed Nov. 23, 2015. Entire Document (Year: 2015).*

(Continued)

*Primary Examiner* — Paul N Dickson
*Assistant Examiner* — Scott F. Underwood
(74) *Attorney, Agent, or Firm* — thyssenkrupp North America, LLC

(57) ABSTRACT

A steering column for a motor vehicle includes a steering shaft rotatably mounted in a steering column housing about a longitudinal axis, and a rotation limiter. The rotation limiter has a stop disk which is connected to the steering shaft to transmit torque. The stop disk includes at least one recess extending in the circumferential direction, such that the steering shaft is coupled to a lifting mechanism, with a stop pin, which is mounted displaceably in the direction of the longitudinal axis and non-displaceably in the circumferential direction and engages with the recess depending on the rotational angle of the steering shaft such that, when the permitted rotational angle of the steering shaft is reached, the stop pin strikes against a boundary of the recess, the boundary lying in the circumferential direction, and prevents further rotation in the same direction of rotation.

14 Claims, 4 Drawing Sheets

(56) References Cited

U.S. PATENT DOCUMENTS

| | | |
|---|---|---|
| 2003/0184072 A1 | 10/2003 | Andonian |
| 2012/0132020 A1 | 5/2012 | Kunsch |
| 2012/0324965 A1 | 12/2012 | Yamamoto |
| 2015/0142266 A1 | 5/2015 | Schramm |
| 2018/0141585 A1* | 5/2018 | Kim ................ B62D 5/001 |

FOREIGN PATENT DOCUMENTS

| | | |
|---|---|---|
| DE | 103 12 516 A | 10/2003 |
| DE | 10 2010 052 546 A | 5/2012 |
| DE | 10 2013 014 138 B | 12/2014 |
| KR | 1020110062630 A | 11/2014 |
| WO | WO-2017089058 A1 * | 6/2017 ............ B62D 5/001 |

OTHER PUBLICATIONS

Nagl, Martin. Translation of DE 102013014138 B3 "Steering Stop". Published Dec. 24, 2014. Entire Document (Year: 2014).*
English Translation of International Search Report issued in PCT/EP2018/059248, dated Jun. 26, 2018.

\* cited by examiner

STEERING COLUMN FOR MOTOR VEHICLES

CROSS REFERENCE TO RELATED APPLICATIONS

This application is a U.S. National Stage Entry of International Patent Application Serial Number PCT/EP2018/059248, filed Apr. 11, 2018, which claims priority to German Patent Application No. DE 10 2017 206 276.2, filed Apr. 12, 2017, the entire contents of both of which are incorporated herein by reference.

FIELD

The present disclosure generally relates to a steering column for a motor vehicle.

BACKGROUND

Systems are used particularly in steer-by-wire steering systems.

Steer-by-wire steering columns are distinguished in that there is no mechanical connection between the steering wheel and the steerable wheels. In order, however, to limit the rotation of the steering wheel even without a mechanical connection between the steering wheel and the steerable wheels, a stop which limits the rotation of the steering wheel has to be provided in the direction of rotation. It is customary in this case for more than one rotation of the steering wheel to be required in order to steer from stop to stop.

DE 103 12 516 A1 discloses a steering column with a rotation limit, wherein two disks each having a spiral track are provided and a ball is arranged between the spiral tracks. During the rotation of the steering shaft, the ball shifts in the spiral tracks. This known solution has the disadvantage of high susceptibility to tolerances since tolerances lead to the balls being able to rattle and become jammed in the spiral tracks.

Thus a need exists to specify a steering column with a rotation limiter, which ensures reliable operation and comprises a low tendency to rattle.

DETAILED DESCRIPTION

Figure 1:
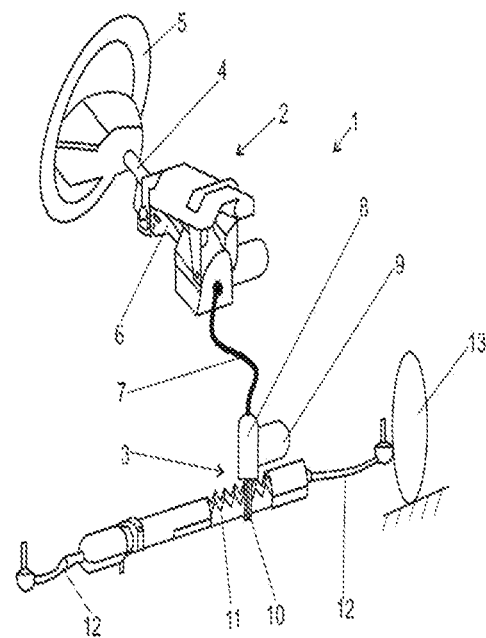
FIG. 1 is a schematic view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, comprising a steering shaft which is mounted in a steering column housing so as to be rotatable about a longitudinal axis, and a rotation limiter.

The object is achieved by the features of patent claim 1. Advantageous embodiments are described in the dependent claims.

In the case of the steering column according to the invention, the rotation limiter has a stop disk which is connected to the steering shaft so as to transmit torque, wherein the stop disk has at least one recess extending in the circumferential direction, and the steering shaft is coupled to a lifting mechanism, by means of which a stop pin, which is mounted displaceably in the direction of the longitudinal axis and non-displaceably in the circumferential direction, can be brought into or out of engagement with one of the recesses depending on the angle of rotation of the steering shaft such that, when the permitted angle of rotation of the steering shaft is reached, the stop pin strikes against a boundary of a recess, said boundary lying in the circumferential direction, and prevents further rotation in the same direction of rotation.

The steering column is preferably provided for a steer-by-wire steering system.

The stop disk can preferably comprise two recesses extending in the circumferential direction.

The solution according to the invention has the advantage that the stop pin is not in engagement with the recess over most of the permitted angle of rotation of the steering shaft, and therefore said stop pin does not come into contact with the boundaries of the recess. This firstly ensures low-wear operation which is reliable for long periods of time and secondly prevents rattling noises from being able to occur over the range of the steering angles customary in the driving mode as a consequence of contact between the stop pin and the boundaries of the recesses.

Within the scope of this invention, the term "recess" comprises both apertures of the stop disk and stop disk grooves which run in the circumferential direction and in which the stop pin can engage and against the ends of which, which lie in the circumferential direction, the stop pin can strike in order to prevent further rotation of the steering shaft in the same direction of rotation. The stop disk here does not have to be circular. In particular, the recesses can also be configured in the form of missing disk segments, and therefore the stop disk, for example, resembles a propeller.

Within the scope of this invention, the term "stop pin" does not only comprise simple pins or bolts, but rather also hooks, pawls and all conceivable embodiments which are suitable for interacting with the stop disk according to the invention in order to block the rotation thereof.

The stop pin and the lifting mechanism are advantageously arranged within a steering column housing. Such a steering column housing is present in any case and can therefore be modified according to the invention in a simple manner.

In an advantageous refinement of the invention, the stop pin is mounted in an axially displaceable manner in a sleeve, which is connected rigidly to the steering column housing, or in a bore of the steering column housing. This measure can be carried out with simple means and ensures a reliable sliding mounting of the stop pin.

In a further advantageous refinement of the invention, the lifting mechanism comprises a gear wheel which is provided with a lifting slot for the displacement of the stop pin. The lifting slot is a disk which is connected to the gear wheel and projects in the radial direction beyond the circumference of the gear wheel and is shaped such that its radially outer edge comprises an undulating shape which takes up different positions in the axial direction depending on the rotational angle of the gear wheel. The undulating shape of the outer edge comprises at least one depression between two elevations, said depression being formed in the direction of the longitudinal axis. In other words, the undulating shape is a slotted guide track which is formed in the axial end surface of the gear wheel in the radial outer region of the gear wheel. When the steering shaft coupled to the lifting mechanism is rotated, the gear wheel and the lifting slot rotate at the same time, wherein the lifting slot, according to the position of its radially outer edge depending on the rotational angle of the gear wheel, displaces the stop pin in the axial direction.

However, the lifting mechanism can also be configured in a linear design, for example in the form of a rack which is connected to a linear lifting slot.

The stop pin is advantageously provided with an encircling groove in which the lifting slot engages. The stop pin can thus be moved in a highly precise manner both into the axial region of the recesses of the stop disk and out of same in the opposite direction.

In order to ensure reliable engagement of the stop pin in the respective recess of the stop disk, the lift of the stop pin is advantageously more than 2 mm, preferably even more than 3 mm. The lift is preferably smaller than 20 mm. Particularly preferably smaller than 10 mm. A lift greater than 20 mm is disadvantageous for the configuration of the slot geometry since this lift requires a high pitch in order to bring the pin into and out of engagement over a small angle and therefore tilting of the lifting mechanism is facilitated.

In a further advantageous refinement of the invention, the gear wheel is in engagement with a pinion, wherein the pinion is connected to the steering shaft so as to transmit torque. A reduction gearing can be realized in this manner with very simple means, wherein the reduction ratio between pinion and gear wheel is advantageously between 2:1 and 4:1, preferably 3:1. This measure ensures that the steering wheel can carry out between two and four rotations from stop to stop, i.e. between one and two rotations in each direction of rotation from its central position. The reduction ratio is preferably 3:1, and therefore the steering wheel can make approximately three rotations between the two end stops, i.e. approximately 1.5 rotations in each direction of rotation from the central position before it strikes against one of the rotation limiters according to the invention.

The invention can advantageously be improved further by the gear wheel with the lifting slot and the stop pin being mounted in a removable cover part of the steering column housing. Said cover part covers that end of the steering column housing which faces away from the steering wheel and at which the steering shaft also ends. The pinion for driving the lifting mechanism can be arranged in a simple manner at this end of the steering shaft. If the gear wheel is mounted eccentrically with respect to the axis of rotation of the steering shaft in said cover part, the gear wheel comes into engagement with the pinion by placing the cover part onto the steering column housing. When the stop disk according to the invention is arranged directly behind the pinion on the steering shaft, the stop pin arranged in the adjacent cover part can also be brought in a simple manner into engagement with the recesses of the stop disk as soon as the cover part is connected to the steering column housing.

The recesses of the stop disk are advantageously configured as two elongated holes which extend in the circumferential direction of the stop disk over an angular range of in each case 90° to 160°. This angular range ensures that the stop pin can be pushed from its pulled-out position completely into the respective elongated hole moving past during the rotation of the stop disk before said stop pin strikes against the boundary at the end of the elongated hole.

FIG. 1 shows a steer-by-wire steering system 1 for a motor vehicle with a steering column 2 and a steering actuation 3. The steering column 2 comprises a steering shaft 4 which bears a steering wheel 5 at one end and which is mostly arranged in a steering column housing 6, in which a rotary encoder (not shown) for the electronic activation of the electric steering actuation 3 is accommodated. Also accommodated in the steering column housing 6 is what is referred to as a manual torque actuator which provides the driver with feedback over the driving situation in the form of a torque which is input into the steering shaft 4. The steering column 2 is connected to the steering actuation 3 via a connecting cable 7. Said steering actuation comprises a steering actuator housing 8 with a steering motor 9 which drives a pinion 10 which, for its part, is in engagement with a rack 11 acting on two tie rods 12 with which the vehicle wheels 13 can be pivoted. The steering actuator housing 8 accommodates a torque transducer (not shown) which measures the torque required for pivoting the vehicle wheels 13 and transmits onto the steering column 2 as feedback for the driver.

Figure 2:
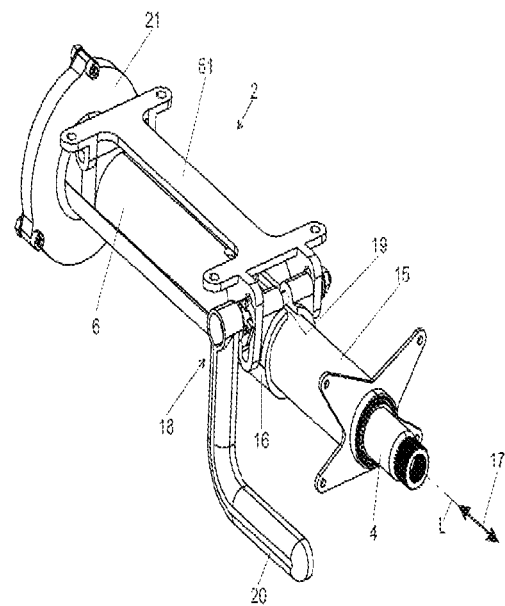
FIG. 2 is a perspective view of a steering column with a rotation limiter.

FIG. 2 shows an essential part of the steering column 2 with the steering column housing 6 in which the steering shaft 4 is rotatably mounted. The steering column housing 6 is held pivotably on a supporting unit 61, wherein the supporting unit 61 can be connected to a vehicle. The steering column 2 comprises an inner casing part 15, in which the steering shaft 4 is rotatably mounted, wherein the inner casing part 15 can be displaced in relation to an outer casing part 16 in the direction of the longitudinal axis L, also referred to as the axial direction 17. In order to fix the inner casing part 15 in the outer casing part 16, a tightening device 18 is provided which clamps together the outer casing part 16, which is provided with a slot 19, and therefore the inner casing part 15 is fixedly clamped in the outer casing part 16. An operating lever 20 is provided for clamping and releasing the tightening device 18. The steering column housing 6 has an end portion 21 which faces away from the steering wheel 5 and in which the rotation limiter 22 according to the invention is accommodated.

Figure 3:
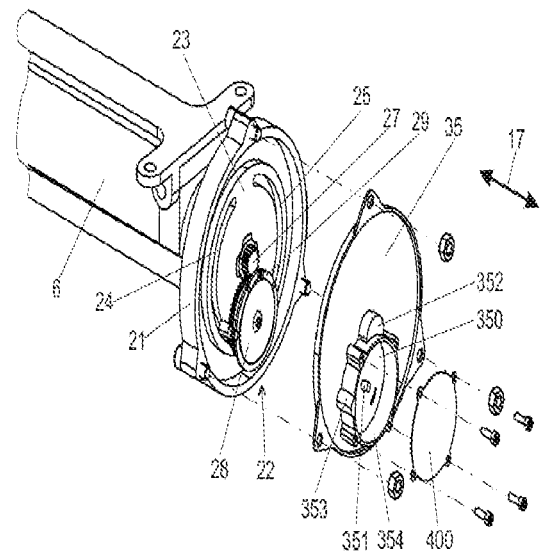
FIG. 3 is a partially exploded view of the steering column of FIG. 2.

FIG. 3 shows how the rotation limiter 22 is arranged in the end portion 21. A stop disk 23 sits directly on the steering shaft 4 and is connected thereto in the region of the end portion of the steering shaft 4 so as to transmit torque. The stop disk 23 has two recesses 24, 25 which run in the circumferential direction and are designed as elongated holes. Furthermore, a pinion 27 which is connected to the steering shaft 4 so as to transmit torque is arranged at the end of the steering shaft 4. The pinion 27 is in engagement with a gear wheel 28 which is mounted eccentrically in the steering column housing 6 and which, together with the pinion 27, forms a reduction gearing 26. In the present exemplary embodiment, the reduction ratio is 3:1, but it can advantageously also be within the range of between 2:1 and 4:1.

The gear wheel 28 is connected to a lifting slot 29 so as to transmit torque. The lifting slot 29 comprises a disk, the diameter of which is larger than the gear wheel 28, and therefore said disk protrudes in the radial direction beyond the outer circumference of the gear wheel 28. The gear wheel 28 and the lifting slot 29 are preferably a single-piece, integral component. The lifting slot 29 is curved in an undulating manner at its circumferentially outer edge region, as seen in the axial direction 17, i.e. in the direction of the longitudinal axis L. The outer edge region of the lifting slot 29 is in engagement with a stop pin 30 which is mounted by means of a sleeve 36 in the steering column housing 6 displaceably in the axial direction 17, but not displaceably in the circumferential direction. The stop pin 30 is provided with an encircling groove 31 in which the lifting slot 29 engages.

Figure 3A:
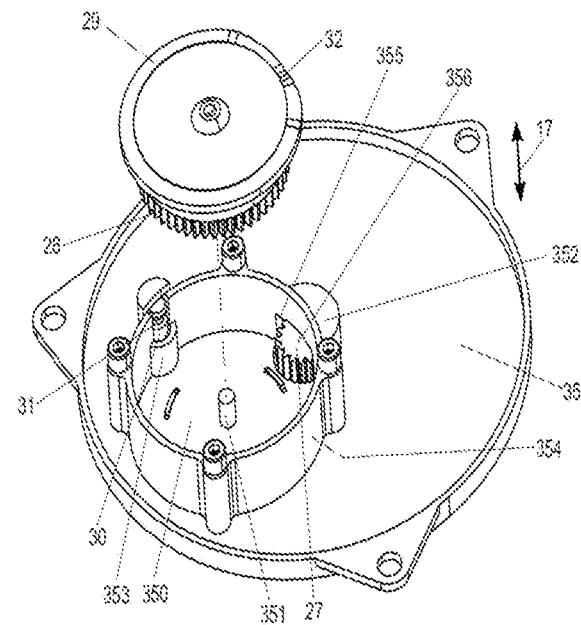
FIG. 3a is an exploded view of the rotation limiter.
Figure 4:
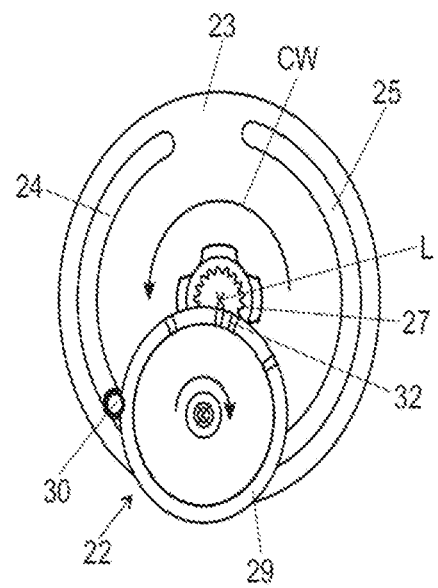
FIG. 4 is a top view of components of the rotation limiter.
Figure 5:
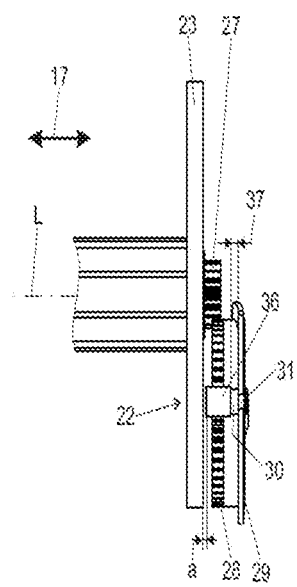
FIG. 5 is a side view of components of the rotation limiter.
Figure 6:
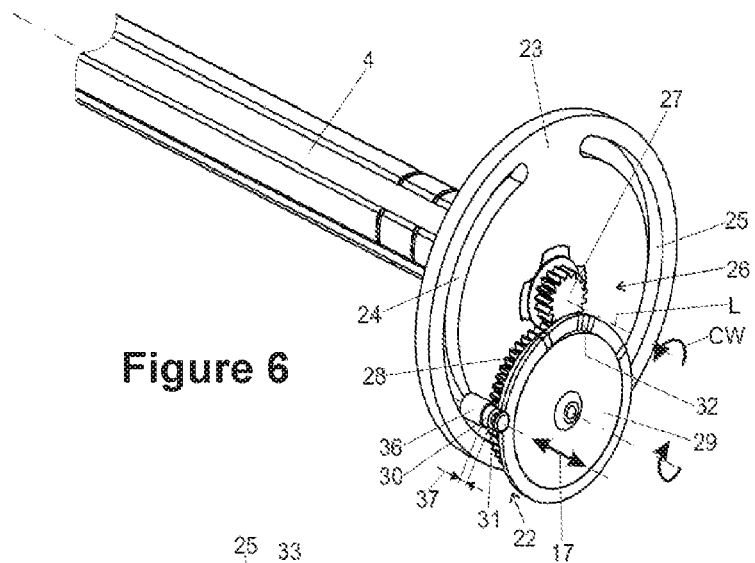
FIG. 6 is a perspective view of components of the rotation limiter in a first movement phase with the stop pin not in engagement.

As can be seen particularly readily in FIG. 3 and FIG. 3a, the gear wheel 28 with the lifting slot 29 and also the stop pin 30 are mounted in a removable cover part 35 of the steering column housing 6. The gear wheel 28 is arranged in a closeable opening 350 of the cover part 35, wherein the gear wheel 28 is mounted rotatably on a journal 351, wherein a cover 400 closes the opening 350. The cover 400 secures the gear wheel 28 against displacement in the direction of the longitudinal axis L, i.e. against displacement on the journal 351. The opening 350 is bounded by a wall 354 which extends in the axial direction 17. The cover part 35 comprises an elevation 352 which is formed radially on the outside next to the wall 354 and forms a receiving opening 355 in which the pinion 27 is arranged. There is a radial aperture 356 between the elevation 352 and the edge 354, as a result of which the opening 350 and the receiving opening 355 of the pinion 27 are connected to each other such that the pinion 27 and the gear wheel 28 are in engagement. The wall 354 comprises a receiving portion 353 in which the stop pin 30 is held displaceably. The eccentric arrangement of gear wheel 28, lifting slot 29 and stop pin 30 thereby becomes possible in a simple manner.

Figure 8:
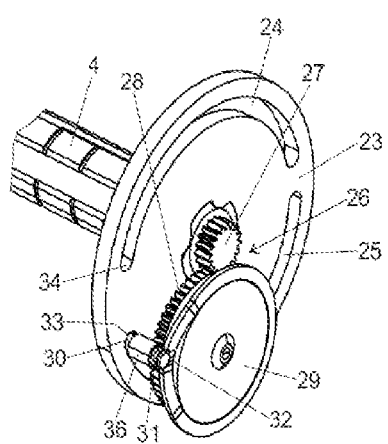
FIG. 8 is a perspective view as in FIG. 6 in a third movement phase with the stop pin in engagement.

If the driver rotates the steering wheel 5, the steering shaft 4 which is connected to the steering wheel 5 drives the pinion 27 and the gear wheel 28. The stop pin 30 which is in engagement with the lifting slot 29 follows the axial position of the outer edge of the lifting slot 29 in the axial direction 17. Over most of the circumference, the outer edge of the lifting slot 29 is in an axial position in which the stop pin 30 is held at a distance a from the stop disk 23. Only in a small circumferential region is the outer edge of the lifting slot 29 formed axially in the direction of the stop disk 23, as a result of which the stop pin 30 also moves toward the stop disk 23 until, at a point 32 of the circumferential region, a position is reached in which the stop pin 30 engages in one of the two recesses 24, 25, designed as elongated holes, of the stop disk 23. This situation is illustrated in FIG. 8. Should the driver now attempt to rotate the steering wheel 5 further in the clockwise direction CW, a boundary 33 of the elongated hole 25 comes into contact with the stop pin 30 which prevents further rotation of the steering shaft 4. During the described operation, the maximum lift 37 of the stop pin 30 is approximately 3 mm. The maximum lift 37 is at least twice the size of the distance a. Secure engagement of the stop pin 30 in the recesses 24, 25 can thereby be ensured.

Figure 7:
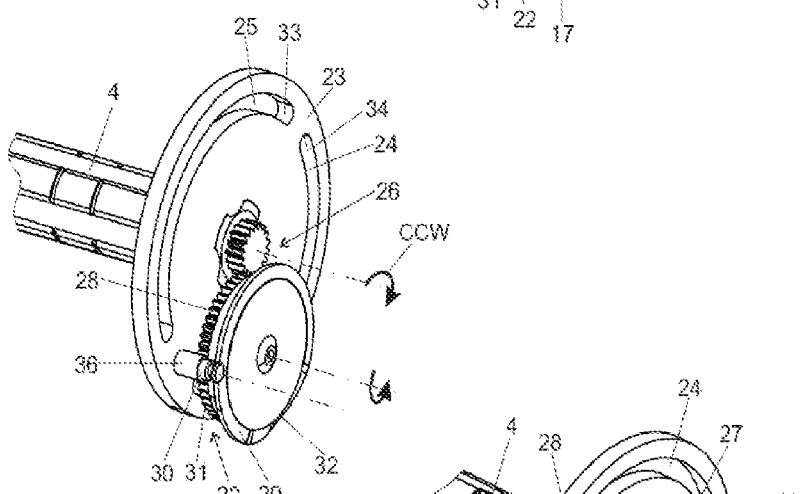
FIG. 7 is a perspective view as in FIG. 6 in a second movement phase with the stop pin not in engagement.

If the driver now rotates the steering wheel 5 in the counter clockwise direction CCW, after approximately half a rotation of the steering shaft 4 the gear wheel 28 with the lifting slot 29 has rotated through a rotation of approximately ⅙, i.e. through approx. 60°, and therefore the point 32 of the circumferential region of the lifting slot 29 takes up the position shown in FIG. 7. The larger circumferential region of the lifting slot 29, which circumferential region is at a greater distance from the stop disk 23 in the axial direction 17, is now located at the position of the stop pin 30. As a result, the stop pin 30 has been displaced in the axial direction 17 and brought out of engagement with the stop disk 23.

The stop pin 30 remains in this position even if the steering wheel 5 and the steering shaft 4 rotate two more times in the counter clockwise direction.

The directions of rotation clockwise CW and counter clockwise CCW always relate to the direction of rotation of the steering wheel 5 from the perspective of the vehicle driver.

Only during a further half rotation of the steering shaft 4 does the point 32 of the circumferential region of the lifting slot 29 again approach the position of the stop pin 30, wherein the stop pin 30 moves in the axial direction 17 toward the stop disk 23. The stop pin enters there into the elongated hole 24 and therefore comes into engagement with the stop disk 23. As soon as a boundary 34 of the elongated hole 24 comes into contact with the stop pin 30, the rotation of the steering shaft 4 in the counter clockwise direction CCW is stopped.

The boundary 34 therefore forms a left stop for the rotational movement of the steering wheel 5 and of the steering shaft 4, and the boundary 33 of the elongated hole 25 forms a right stop for the rotational movement, wherein virtually 3 rotations of the steering wheel 5 and of the steering shaft 4 are possible between the two stops.

This is made possible by the interaction of the gear wheel 28 with the lifting slot 29 and the stop pin 30 which together form a lifting mechanism 28, 29, 30.

The transmission ratio of the reduction gearing 26 determines here how many rotations of the steering wheel 5 are possible between the two rotary stops. Furthermore, the possible angle of rotation of the steering wheel 5 between the two end stops is also determined by the extent of the elongated holes 24, 25 in the circumferential direction of the stop disk 23.

In order to ensure a reliable engagement of the stop pin 30 in the elongated holes 24, 25 of the stop disk 23, the lifting slot 29 has to be shaped in such a manner that the lift 37 of the stop pin 30 in the axial direction 17 is at least 2 mm, and better more than 3 mm.

The embodiment according to the invention of a rotation limiter is distinguished by quiet operation and permits relatively large manufacturing tolerances without impairing its function.

LIST OF DESIGNATIONS

1. Steer-by-wire steering system
2. Steering column
3. Steering actuation
4. Steering shaft
5. Steering wheel
6. Steering column housing 7. Connecting cable
8. Steering actuator housing
9. Steering motor
10. Pinion
11. Rack
12. Tie rod
13. Vehicle wheel
14. Clamping device
15. Inner casing part
16. Outer casing part
17. Axial direction
18. Tightening device
19. Slot
20. Operating lever
21. End portion
22. Rotation limiter
23. Stop disk
24. Recess/elongated hole
25. Recess/elongated hole
26. Reduction gearing
27. Pinion
28. Gear wheel
29. Lifting slot
30. Stop pin
31. Groove
32. Point of the circumferential region
33. Boundary
34. Boundary
35. Cover part
36. Sleeve
37. Lift

What is claimed is:

1. A steering column for a motor vehicle, comprising:
a steering column housing;
a steering shaft which is rotatably mounted about a longitudinal axis in the steering column housing; and
a rotation limiter, comprising:
    a stop disk connected to the steering shaft so as to transmit torque, the stop disk comprising:
        a recess extending in a circumferential direction,
        wherein the steering shaft is coupled to a lifting mechanism, by which a stop pin, which is mounted displaceably in the direction of the longitudinal axis and non-displaceably in the circumferential direction, is configured to engage with the recess depending on a rotational angle of the steering shaft such that, when a permitted rotational angle of the steering shaft is reached, the stop pin strikes against a boundary of the recess, said boundary lying in the circumferential direction, and prevents further rotation in the same direction of rotation,
        wherein the lifting mechanism comprises a gear wheel that is provided with a lifting slot for the displacement of the stop pin.

2. The steering column of claim 1 wherein the stop pin and the lifting mechanism are arranged within the steering column housing.

3. The steering column of claim 2 wherein the stop pin is mounted in an axially displaceable manner in a sleeve that is connected rigidly to the steering column housing, or in a bore of the steering column housing.

4. The steering column of claim 1 wherein the stop pin is provided with an encircling groove in which the lifting slot engages.

5. The steering column of claim 1 wherein the lift of the stop pin is more than 2 mm.

6. The steering column of claim 1 wherein the gear wheel is in engagement with a pinion, the pinion connected to the steering shaft so as to transmit torque.

7. The steering column of claim 6 wherein a reduction ratio between the pinion and the gear wheel is between 2:1 and 4:1.

8. The steering column of claim 1 wherein the gear wheel with the lifting slot and the stop pin are mounted in a removable cover part of the steering column housing.

9. A steering column for a motor vehicle, comprising:
a steering column housing;
a steering shaft which is rotatably mounted about a longitudinal axis in the steering column housing; and
a rotation limiter, comprising:
    a stop disk connected to the steering shaft so as to transmit torque, the stop disk comprising:
        a recess extending in a circumferential direction,
        wherein the steering shaft is coupled to a lifting mechanism, by which a stop pin, which is mounted displaceably in the direction of the longitudinal axis and non-displaceably in the circumferential direction, is configured to engage with the recess depending on a rotational angle of the steering shaft such that, when a permitted rotational angle of the steering shaft is reached, the stop pin strikes against a boundary of the recess, said boundary lying in the circumferential direction, and prevents further rotation in the same direction of rotation,
        wherein the recess is configured as two elongated holes which extend in the circumferential direction of the stop disk over an angular range of in each case 90° to 160°.

10. The steering column of claim 9 wherein the stop pin and the lifting mechanism are arranged within the steering column housing.

11. The steering column of claim 10 wherein the stop pin is mounted in an axially displaceable manner in a sleeve that is connected rigidly to the steering column housing, or in a bore of the steering column housing.

12. The steering column of claim 10 wherein the lift of the stop pin is more than 2 mm.

13. The steering column of claim 10 wherein the gear wheel is in engagement with a pinion, the pinion connected to the steering shaft so as to transmit torque.

14. The steering column of claim 13 wherein a reduction ratio between the pinion and the gear wheel is between 2:1 and 4:1.

* * * * *